(12) United States Patent
Shirataki et al.

(10) Patent No.: US 7,861,836 B2
(45) Date of Patent: *Jan. 4, 2011

(54) ROLLER-TYPE ONE-WAY CLUTCH

(75) Inventors: Hirobumi Shirataki, Fukuroi (JP);
Kazuhiko Muramatsu, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 657 days.

This patent is subject to a terminal disclaimer.

(21) Appl. No.: 11/783,383

(22) Filed: Apr. 9, 2007

(65) Prior Publication Data

US 2007/0251794 A1 Nov. 1, 2007

(30) Foreign Application Priority Data

Apr. 10, 2006 (JP) .............................. 2006-107140

(51) Int. Cl.
*F16D 13/04* (2006.01)
(52) U.S. Cl. ........................................................ 192/45
(58) Field of Classification Search ....................... None
See application file for complete search history.

(56) References Cited

U.S. PATENT DOCUMENTS 2,976,092 A * 3/1961 Anderson ................... 384/572
3,104,744 A * 9/1963 Wade ........................... 192/45
3,476,226 A * 11/1969 Massey ........................ 192/27
3,718,212 A   2/1973 Havranek
7,147,091 B2 * 12/2006 Iga et al. ....................... 192/45
2002/0046914 A1   4/2002 Saiko
2005/0217959 A1 * 10/2005 Iga et al. ....................... 192/45
2006/0137955 A1 *  6/2006 Shirataki et al. ........... 192/41 A

FOREIGN PATENT DOCUMENTS

JP          9-229096        9/1997

* cited by examiner

*Primary Examiner*—David D Le
*Assistant Examiner*—Ryan Dodd
(74) *Attorney, Agent, or Firm*—Miles & Stockbridge P.C.

(57) ABSTRACT

The present invention provides a roller-type one-way clutch comprising an annular outer race provided at its inner periphery with a cam surface, an inner race spaced apart from the outer race in a radially inner diameter side and disposed coaxially with the outer race for a relative movement therewith and having an annular outer peripheral track surface, a plurality of rollers disposed between the outer race and the inner race and adapted to transmit torque between the outer peripheral track surface and the cam surface, a cage for holding the plurality of rollers, and a C-shaped annular spring for biasing the rollers, through the cage, toward engagement with the cam surface.

9 Claims, 2 Drawing Sheets

ROLLER-TYPE ONE-WAY CLUTCH

BACKGROUND OF THE INVENTION

1. Field of the Invention

The present invention relates to a roller-type one-way clutch used, for example, as a part for transmitting torque or as a back stopper in a driving apparatus of motor vehicles, industrial machines and the like.

2. Description of the Related Art

In general, a roller-type one-way clutch comprises an outer race, an inner race disposed coaxially with the outer race, a plurality of rollers disposed between an outer peripheral surface of the inner race and an inner peripheral cam surface of the outer race and adapted to transmit torque, and springs contacted with the rollers at an idle rotation side.

In the one-way clutch having such an arrangement, the inner race is rotated in only one direction with respect to the outer race by a cam mechanism constituted by the rollers and the cam surface. That is to say, it is designed so that the inner race is idly rotated with respect to the outer race in one direction and can transmit rotational torque to the outer race through the cam mechanism only in the other direction.

In general, in the roller-type one-way clutch, it is required to design so that, even if abrupt engagement is generated, all of the rollers must be engaged positively. For example, even under severe use conditions such as an environment where the clutch is exposed to high vibration and/or a very low temperature, in order to ensure the engaging ability of the roller-type one-way clutch, it is necessary to considerably increase an urging force (drag torque) of each of the springs for biasing the rollers toward the engaging direction. However, by doing so, there can arise problems regarding drag loss and wear during the idle rotation.

Further, in a roller type one-way clutch for motor bicycles, since the number of rollers is small (for example, three or six), if all of the rollers are not engaged positively, required design torque capacity may not be obtained.

As disclosed in Japanese Patent Application Laid-open No. 9-229096 (1997), the rollers are biased toward the engaging direction by the spring so that the rollers are engaged by the cam surface of the outer race. In this case, a number of springs corresponding to the number of rollers must be provided; however, in such a case, due to variation in properties of the springs, it was difficult to synchronize the rollers.

SUMMARY OF THE INVENTION

An object of the present invention is to provide a one-way clutch in which all of rollers can be synchronized uniformly and, even under an environmental condition having high vibration encountered by motor bicycles and the like, all of the rollers can be engaged positively.

To achieve the above object, the present invention provides a roller-type one-way clutch comprising an annular outer race provided at its inner periphery with a cam surface, an inner race spaced apart from the outer race in a radially inner diameter side and disposed coaxially with the outer race for a relative movement therewith and having an annular outer peripheral track surface, a plurality of rollers disposed between the outer race and the inner race and adapted to transmit torque between the outer peripheral track surface and the cam surface, a cage for holding the plurality of rollers, and a C-shaped annular spring for biasing the rollers in a direction in which the rollers are engaged by the cam surface, through the cage.

According to the present invention, the following advantages can be obtained.

Since all of the rollers can be synchronized uniformly (full phasing function), even under an environmental condition having high vibration encountered by motor bicycles, all of the rollers can be engaged positively.

Further, since it is not required to provide respective leaf springs or coil springs and caps for corresponding rollers, the number of parts can be reduced, operability can be improved, and assembling of the clutch can be simplified.

Particularly, it is possible to reduce the drag torque during high speed rotation, to reduce fuel consumption and to prevent wear between the rollers and the inner race.

Further features of the present invention will become apparent from the following description of exemplary embodiments with reference to the attached drawings.

DESCRIPTION OF THE EMBODIMENTS

Figure 1:
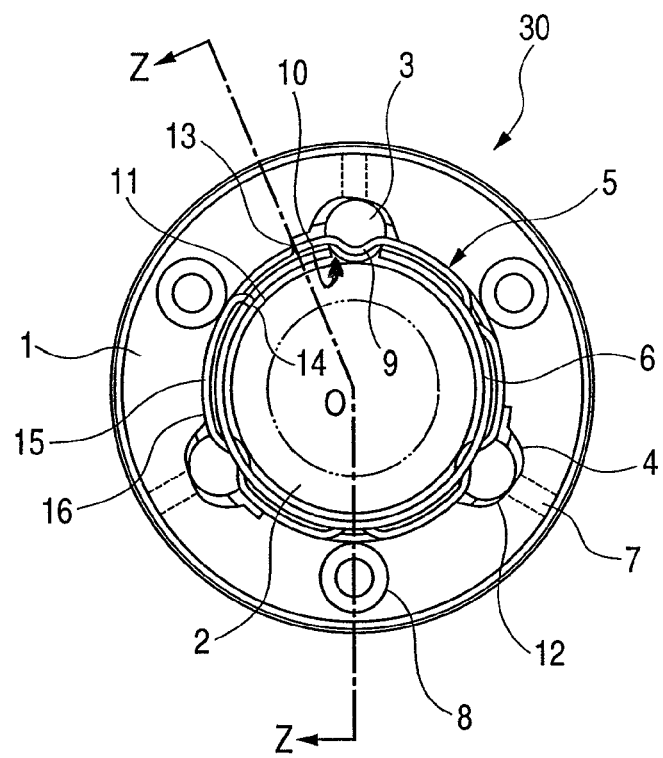
FIG. 1 is a front view of a roller-type one-way clutch according to an embodiment of the present invention.

Now, the present invention will be fully explained with reference to the accompanying drawings. Incidentally, it should be noted that embodiments which will be described hereinafter are merely examples, but do not limit the present invention. Further, in the drawings, the same or similar elements are designated by the same or similar reference numerals.

Figure 2:
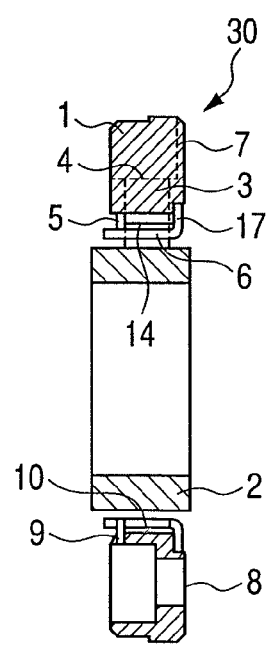
FIG. 2 is an axial sectional view taken along the line Z-O-Z in FIG. 1.

FIG. 1 is a front view of a roller-type one-way clutch according to an embodiment of the present invention. Further, FIG. 2 is a sectional view taken along the line Z-O-Z in FIG. 1.

A roller-type one-way clutch 30 comprises an annular outer race 1 which is provided at its inner periphery with recessed portions 4 having cam surfaces 12, and an inner race 2 spaced radially inwardly from the outer race 1 and disposed coaxially with the outer race for relative movement therebetween and having an annular outer peripheral track surface 11, a plurality of rollers 3 disposed between the outer race 1 and the inner race 2 and adapted to transmit torque between the outer peripheral track surface 11 and the cam surfaces 12, a cage 6 for holding the plurality of rollers 3, and a C-shaped annular spring 5 for biasing the rollers 3 in a direction in which the rollers 3 are engaged by the cam surfaces 12, through the cage 6.

Three recessed portions 4 are provided in the outer race 1 equidistantly along a circumferential direction. Further, three axial through-holes 8 used for securing the outer race 1 to output and input members (not shown) are also provided in the outer race equidistantly along the circumferential direction. As shown in FIG. 1, the recessed portions 4 and the through-holes 8 are disposed alternately and equidistantly. Further, it should be noted that typically three to six recessed portions and through-holes can be used in accordance with the magnitude of the torque.

The cage 6 is provided with pocket portions 10 passing through the cage in a radial direction. The rollers 3 are rotatably or swingably received in the corresponding pocket portions 10.

Further, the C-shaped annular spring 5 is disposed between the outer race 1 and the inner race 2. The annular spring 5 has two ends 13 and 14 and is divided or split between the two ends; however, the spring has a substantially annular structure as a whole. Further, the annular spring 5 has a plurality of curved portions 9 protruding toward the inner diameter side and disposed equidistantly in the circumferential direction. The curved portions 9 disposed equidistantly along the circumferential direction are fitted into the corresponding pocket portions 10 of the cage 6. That is to say, as can be seen in FIG. 1, the curved portions 9 are fitted into the pocket portions together with the rollers 3. Only the curved portions 9 are fitted into the pocket portions 10.

In this way, by engaging the curved portions of the C-shaped annular spring 5 with the pocket portions 10 of the cage 6, the annular spring 5 can be prevented from dislodging in the axial direction. Further, side plates are not required, whereby the number of parts can be reduced.

As mentioned above, the curved portions 9 of the annular spring 5 are protruded toward the inner race 2. Preferably, a protruded amount of each curved portion is selected so that the curved portion 9 does not contact with the outer peripheral track surface 11 of the inner race 2 in order to prevent the annular spring 5 from being rotated together with the inner race.

Further, an urging force for engaging the rollers 3 with the cam surfaces 12 is transmitted from the annular spring 5 to the rollers 3 through the cage 6. That is to say, a restoring force of the C-shaped annular spring 5 is applied to the rollers 3 indirectly. Thus, it is not required to provide respective leaf springs or coil springs and caps for the corresponding rollers 3.

Figure 3:
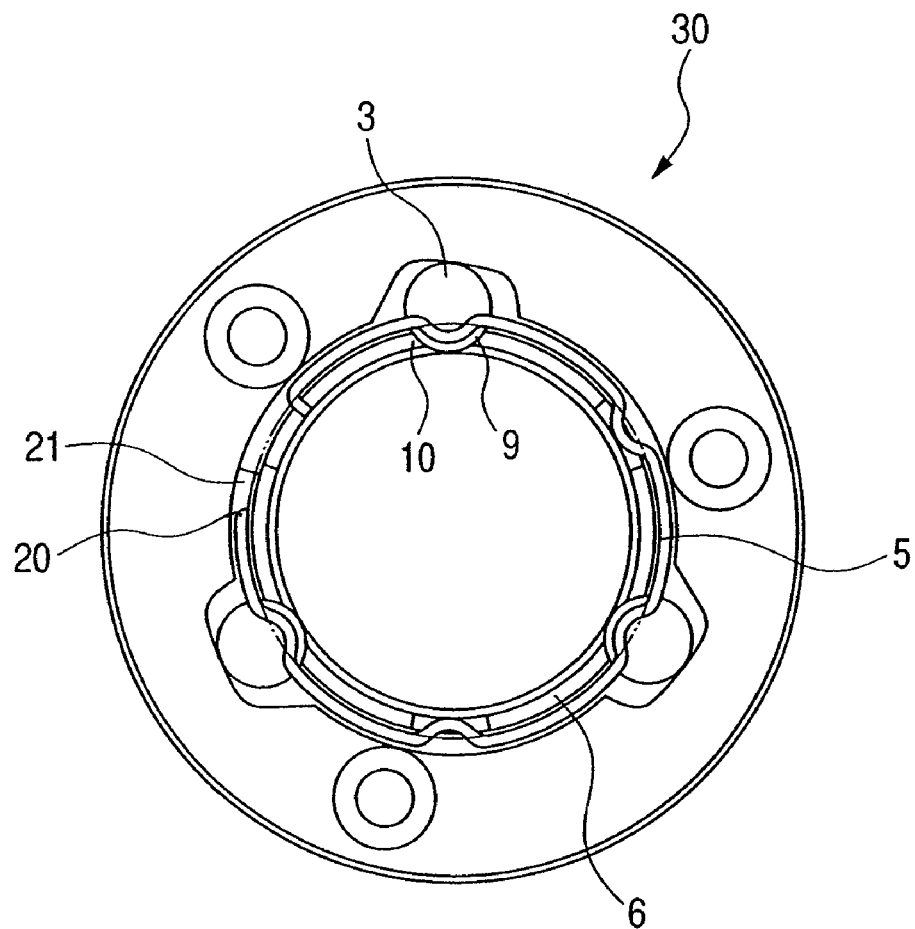
FIG. 3 is a front view of a roller-type one-way clutch according to another embodiment of the present invention.

As shown in FIGS. 1 and 3, in each of the recessed portions 4 provided in the inner periphery of the outer race 1, a radial height of a left side (FIGS. 1 and 4) of the recessed portion is greater than that of a right side. Accordingly, when the rollers 3 are positioned at the right sides of the recessed portions 4 by the relative rotation between the outer race 1 and the inner race 2, the rollers 3 are engaged by the cam surfaces 12, thereby transmitting the torque.

The outer race 1 is provided at its inner diameter edge with substantially annular stepped portions 16 into which annular portions 15 of the annular spring 5 are fitted. Thus, any movement of the annular spring in the opposite direction is regulated by the engagement between the annular spring 5 and the stepped portions 16. As a result, even if the roller-type one-way clutch 30 is inclined toward a flange portion 17 of the cage 6, since the annular portions 15 of the annular spring 5 are engaged with the outer race 1 and the curved portions 9 are fitted in the cage 6, internal parts such as the rollers 3 can be prevented from being dislodged.

By inserting the annular spring 5 in the stepped portions 16 of the outer race 1 and by centering the annular spring 5, the annular spring 5 is prevented from being dislodged in the axial direction and the operation of the annular spring 5 is stabilized.

By guiding the flange portion 17 of the cage 6 by means of the stepped portions of the outer race 1, the cage 6 is centered, and, thus, the cage 6 can be prevented from being dislodged in the axial direction and stable engagement can be realized.

A circumferential width of the pocket portion 10 of the cage 6 is set to be smaller than a diameter of the roller 3. Accordingly, since the rollers 3 are not dropped toward the inner diameter side, the one-way clutch can be assembled as an integrated structure.

In correspondence to the recessed portions 4 of the outer race 1, the outer race is provided at its one axial end surface with grooves 7 extending in the radial direction and communicated with the corresponding recessed portions 4. The grooves 7 may be formed, for example, by a sintering mold. During the operation of the roller-type one-way clutch, although dust and/or other foreign matters may be accumulated in the recessed portions 4 having the cam surfaces 12, such foreign matters are discharged outside through the grooves 7. Thus, a poor operation of the clutch due to dust accumulation can be prevented. The grooves 7 may be formed in both axial end surfaces of the outer race 1.

As shown in FIG. 2, the end 14 of the annular spring 5 is bent axially inwardly to abut against the inner peripheral surface of the outer race 1.

Figure 4:
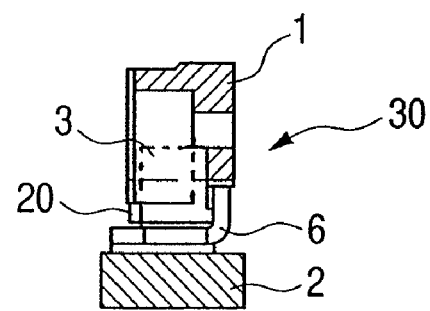
FIG. 4 is an axial partial sectional view of the embodiment of FIG. 3.

FIGS. 3 and 4 are views showing another embodiment of the present invention, where FIG. 3 is a front view of a roller-type one-way clutch and FIG. 4 is a partial axial sectional view of FIG. 3. In this example, one end 20 of an annular spring 5 is engaged with a recessed portion 21 provided in an inner periphery of an outer race 1. With this arrangement, the annular spring 5 can be prevented from being rotated together with the outer and inner races.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions consistent with the principles described herein.

This application claims the benefit of Japanese Patent Application No. 2006-107140, filed Apr. 10, 2006, which is hereby incorporated by reference herein in its entirety.

What is claimed is:

1. A roller type one-way clutch comprising:
    an annular outer race provided at its inner periphery with a cam surface;
    an inner race spaced radially inwardly from said outer race and disposed coaxially with said outer race for relative movement therebetween, said inner race having an annular outer peripheral track surface;
    a plurality of rollers disposed between said outer race and said inner race and adapted to transmit torque between said outer peripheral track surface and said cam surface;
    a cage having a plurality of radially penetrating pocket portions, said cage holding said plurality of rollers with each roller being received in a respective one of said pocket portions and each pocket portion having a circumferential width that is smaller than a diameter of the corresponding roller; and
    a C-shaped annular spring biasing said rollers, through said cage, toward engagement with said cam surface,
    wherein said spring has a plurality of curved portions equidistantly disposed along a circumferential direction and protruding from an inner diameter side of said spring, said curved portions each being fitted into a respective one of said pocket portions of said cage.

2. A roller-type one-way clutch according to claim 1, wherein said outer race is provided at its inner diameter edge with a stepped portion with which said spring is engaged.

3. A roller-type one-way clutch according to claim 1, wherein said outer race is provided at its inner diameter edge with a stepped portion, said spring being engaged with said stepped portion, thereby centering said spring.

4. A roller-type one-way clutch according to claim 1, wherein said outer race is provided at its inner diameter edge with a stepped portion to guide a flange portion of said cage, and thereby center said cage.

5. A roller-type one-way clutch according to claim 1, wherein a groove is formed in one axial end surface of said outer race at a position corresponding to a respective recess of said cam surface associated with each roller of the one-way clutch.

6. A roller-type one-way clutch according to claim 1, wherein an end of said annular spring is bent so as to be in contact with the inner peripheral surface of said outer race.

7. A roller-type one-way clutch according to claim 1, wherein an end of said annular spring is engaged with a recess portion provided in an inner diameter portion of said outer race.

8. A roller type one-way clutch comprising:
- an annular outer race provided at its inner periphery with a cam surface;
- an inner race spaced radially inwardly from said outer race and disposed coaxially with said outer race for relative movement therebetween, said inner race having an annular outer peripheral track surface;
- a plurality of rollers disposed between said outer race and said inner race and adapted to transmit torque between said outer peripheral track surface and said cam surface;
- a cage having a plurality of radially penetrating pocket portions, said cage holding said plurality of rollers with each roller being received in a respective one of said pocket portions and each pocket portion having a circumferential width that is smaller than a diameter of the corresponding roller; and
- a C-shaped annular spring biasing said rollers, through said cage, toward engagement with said cam surface,
- wherein said spring has a plurality of circumferentially spaced curved portions protruding from said spring, each curved portion being engaged with a respective one of said pocket portions and being received in the respective pocket portion at a position adjacent to an axial end of the corresponding roller.

9. A roller-type one-way clutch according to claim 8, wherein said curved portions protrude from an inner diameter side of said spring.

* * * * *